United States Patent Office 3,398,128
Patented Aug. 20, 1968

3,398,128
COPOLYMERS OF FLUORINATED DIENES
AND PROCESS FOR PREPARING SAME
Archibald N. Bolstad, Maplewood, N.J., and John M. Hoyt, Woodside, Flushing, N.Y., assignors, by mesne assignments, to Minnesota Mining and Manufacturing Company, St. Paul, Minn., a corporation of Delaware
No Drawing. Filed July 1, 1955, Ser. No. 519,651
6 Claims. (Cl. 260—87.7)

ABSTRACT OF THE DISCLOSURE

Copolymers of 1,1,2-trifluorobutadiene-1,3 and another fluorinated 1,3-diene having from 4 to 5 carbon atoms per molecule containing two fluorine atoms on a terminal carbon atom and at least one hydrogen atom and the process for copolymerization of the monomers to produce such copolymers.

---

This invention relates to halogen-containing copolymers. In one aspect, the invention relates to fluorine-containing copolymers. More particularly, in this aspect, the invention relates to fluorine-containing elastomeric copolymers and the method for their manufacture.

Fluorine-containing copolymers have been found to possess many useful applications by virtue of their relative chemical inertness and high physical strength and solvent resistance. Because of these properties, such fluorine-containing copolymers can be fabricated into a wide variety of useful articles having improved chemical and physical stability. In this respect, it is also desirable for these fluorine-containing copolymers, in addition to the aforementioned characteristics, to also possess elastomeric properties so that a high degree of flexibility, elasticity and extensibility is obtained, and which can be easily vulcanized and processed.

It is, therefore, an object of this invention to provide new and useful fluorine-containing copolymers having desirable chemical and physical characteristics.

Another object of the invention is to provide new and useful fluorine-containing elastomeric copolymers, having the aforementioned characteristics, which can be easily fabricated into a wide variety of useful articles of improved chemical and physical stability.

Still another object of the invention is to provide a method for the preparation of the aforementioned elastomeric fluorine-containing copolymers.

Various other objects and advantages inherent in the present invention will become apparent to those skilled in the art from the accompanying description and disclosure.

The copolymers of the present invention are elastomeric copolymers of a polymerizable straight-chain diene containing at least one hydrogen atom and at least one terminal carbon atom having two fluorine substituents, and another different polymerizable straight-chain diene containing at least one terminal carbon atom having two fluorine substituents. In general, as more fully hereinafter disclosed, these copolymers are prepared by copolymerizing the aforementioned straight-chain dienes in the presence of a copolymerization catalyst at temperatures between about 0° C. and about 90° C., and preferably at a temperature between about 25° C. and about 50° C. The copolymers thus obtained are valuable macromolecules which are adaptable to a number of commercial uses, having physical characteristics comparable to natural rubber gum-stocks and solvent-swell characteristics comparable to fluorine-containing rubbers. In particular, in addition, they possess low-temperature flexibility, elasticity and resiliency, and can be easily vulcanized and processed. These copolymers are chemically and thermally stable, resistant to oil and hydrocarbon-fuels, selectively soluble in various organic solvents, and can be molded by conventional techniques to yield a wide variety of useful articles. They are also useful as durable, flexible, protective coatings on surfaces which are subjected to environmental conditions in which they may come into contact with various corrosive substances, such as oils, fuels and strong chemical reagents.

As indicated above, the polymerizable straight-chain diene containing at least one hydrogen atom and at least one terminal carbon atom having two fluorine substituents, is polymerized with another different polymerizable straight-chain diene containing at least one terminal carbon atoms having two fluorine substituents. Examples of the first mentioned polymerizable straight-chain diene are 1,1,2-trifluorobutadiene; 1,1,3-trifluorobutadiene; 1,1,2,4-tetrafluorobutadiene; 1,1-difluorobutadiene; 1,1,2,4,4-pentafluorobutadiene; and 5,5,5-trifluoropentadiene-1,3. Examples of the second mentioned other polymerizable straight-chain diene include any of the aforementioned straight-chain dienes and perfluorobutadiene.

The most useful elastomeric copolymers produced in accordance with this invention contain between about 5 mol per cent and about 95 mol percent of any of the aforementioned polymerizable dienes, the remaining major constituent being any of the other aforementioned remaining straight-chain dienes. Copolymers containing between about 25 mol percent and about 75 mol percent of one of the above dienes are preferred.

The elastomeric copolymers of this invention are preferably prepared by employing a peroxy type catalyst containing the O—O linkage, in either a water-emulsion type recipe or as an organic peroxide promoter in a bulk-type polymerization system. The water-emulsion type recipe system is preferred. The peroxy compound present in these water-emulsion or bulk-type recipes functions as an oxidant. This oxidant is preferably an inorganic persulfate, such as potassium persulfate, sodium persulfate or ammonium persulfate. There is also present in the water-emulsion type recipes, a reductant which is preferably in the form of a bisulfite, such as potassium bisulfite, sodium bisulfite, potassium metabisulfite, or sodium metabisulfite. The oxidant comprises between about 0.1 and about 5 parts by weight per 100 parts of total monomers present. The reductant, for example, sodium metabisulfite, comprises between about 0.05 and about 5 parts by weight per 100 parts of total monomers present, and preferably comprises between about 0.1 and about 2 parts by weight per 100 parts of total monomers present. It has been found that the presence of such materials as borax along with the oxidant and the reductant is beneficial in these water-emulsion type recipes in aiding in the maintenance of optimum pH conditions.

The emulsifying agent, employed in the above-mentioned water-emulsion type recipe systems, is present either in the form of an aliphatic acid metal salt, having from 14 to 20 carbon atoms per molecule or in the form of a halogenated organic acid having from 6 to 18 carbon atoms per molecule. A typical example of these emulsifying agents is potassium stearate (KORR soap). Typical examples of the halogenated organic acids serving as emulsifying agents in the above-mentioned recipes are salts derived from fluorocarboxylic acids (e.g., perfluorooctanoic acid) or perfluorochlorocarboxylic acids (e.g., trifluorochloroethylene telomer acid soaps). The fluorocarboxylic acid salts which may be employed are those disclosed in U.S. Patent No. 2,559,752; and the non-acidic derivatives of the acids disclosed therein as being effective dispersing agents in polymerization reactions may also be used in the process of the present invention. The perfluorochlorocarboxylic acid salts which may be used in accordance with this invention are those disclosed in co-pending application Ser. No. 501,782, filed Apr. 18, 1955, as being useful dispersing agents in polymerization reactions. In general, these emulsifying agents comprise between about 0.5 and about 10 parts by weight per 100 parts of total monomers present.

The emulsion polymerization is preferably conducted under alkaline conditions. It is desirable in these emulsion polymerization systems that the pH be maintained within the limits of between about 7 and 11, in order to prevent gelling of the emulsifying agents, a condition which often causes slowdown or stoppage of the polymerization reaction. In this respect, it should be noted that it is sometimes necessary to maintain the pH of the system between the aforementioned pH limits by the addition of suitable buffer agents. Typical examples are sodium borate and disodium phosphate.

As indicated above, the polymerization reactions may also be carried out in which the catalyst is present in the form of an organic peroxide promoter in a bulk-type polymerization system. Of these organic peroxide promoters, halogen-substituted acetyl peroxides are preferably employed. A preferred promoter of this type is trichloroacetyl peroxide. Other halogen-substitued organic peroxides which are suitable for carrying out the copolymerization are trifluorodichloropropionyl peroxide, trifluoroacetyl peroxide, difluoroacetyl peroxide, 2,4-dichlorobenzoyl peroxide, chloroacetyl peroxide, dichlorofluoroacetyl peroxide. The copolymerizations described herein to produce the copolymers of the present invention are carried out under autogenous conditions of pressure. In general, these pressures do not rise above approximately 500 pounds per square inch.

As previously indicated, the elastomeric copolymers of the present invention are particularly suitable and useful for the fabrication of a wide variety of rubber-like materials having highly desirable chemical and physical properties. In this respect, the copolymers of the present invention possess important utility in the manufacture of protective articles of clothing, such as boots, suits, gloves, belts and in the fabrication of resilient gaskets, seals, pump and valve-diaphragms, films and other commercial applications.

Another important use of the copolymers of the present invention is in the form of durable, flexible coatings to fabric surfaces. For this purpose, the polymers of this invention may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate, and 1,1,3-trifluorotrichloroethane. In this respect, it is often desirable to reduce the molecular weight of the copolymers of this invention in order to obtain greater solubility in organic solvents. This is of importance in order to vary the softness of the copolymer for easier processability in subsequent molding operations. It is found that the addition of various polymerization modifiers appreciably reduces the molecular weight of the copolymeric products and increases their solubility and ease of processability without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$), bromotrichloroethane ($CBrCl_3$), and dodecyl mercaptan

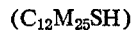

($C_{12}M_{25}SH$)

These modifiers are preferably added in amounts between about 0.01 to about 10 parts by weight per 100 parts of total monomers charged to the polymerization reaction. Dodecyl mercaptan is preferred.

The following examples are offered for a better understanding of the present invention and are not to be construed as limiting its scope.

Example I

This example illustrates the copolymerization of 1,1,2-trifluorobutadiene and 1,1,3-trifluorobutadiene to produce an elastomeric copolymer.

A heavy-walled glass polymerization tube was flushed with nitrogen and was then charged with 7 ml. of a 0.75% aqueous solution of the $C_8$-telomer acid derived from chlorotrifluoroethylene, $Cl(CF_2CFCl)_3CF_2COOH$, which had been adjusted to pH 9.5 with KOH solution. The potassium $C_8$-telomerate, $Cl(CF_2CFCl)CF_2COOK$, functions as an emulsifier. The stoppered tube was then placed in a Dry Ice-acetone freezing bath. After the contents of the tube were frozen solid, the tube was charged with 3 ml. of a 1% aqueous solution of potassium persulfate. In a separate experiment it was found that the final pH is 7.0 when the aforesaid solutions, in the amounts stated, are mixed without freezing. The contents of the tube were then refrozen, and the tube was connected to a gas-transfer system and evacuated at liquid nitrogen temperature. Thereafter 3.75 grams of 1,1,3-trifluoro-1,3-butadiene and 1.25 grams of 1,1,2-trifluoro-1,3-butadiene were distilled into the tube to make up a total monomer charge comprising 75 mole percent of 1,1,3-trifluoro-1,3-butadiene and 25 mole percent of 1,1,2-trifluoro-1,3-butadiene. The aforementioned monomers are prepared by the procedure as is disclosed in the Journal of the American Chemical Society, vol. 77, page 2786 (May 20, 1955). The polymerization tube was then sealed and rotated end-over-end in a temperature-regulated water-bath at 50° C. The polymerization was conducted under autogenous pressure at 50° C. for a period of 24 hours. The polymer latex thus obtained was coagulated by freezing at liquid nitrogen temperature. The coagulated product was collected, washed with hot water, and dried to constant weight in vacuo at 35° C. A relatively soft, snappy rubber was obtained which was found, upon analysis, to comprise approximately 35 mol percent of 1,1,2-trifluoro-1,3-butadiene, and the remaining major constituent 1,1,3-trifluoro-1,3-butadiene. The copolymer was obtained in an amount corresponding to a 63% conversion.

A sample of the raw copolymer was compression molded at 250° F. for 5 minutes. After molding, the sample remained as a snappy rubber. A volume increase of only 18.5% was observed in the molded sample, when tested according to ASTM Designation D–471–49T, in ASTM Type II Fuel, which consists of isooctane (60% by volume), benzene (5% by volume), toluene (20% by volume), and xylene (15% by volume), Gehman stiffness of the molded sample of raw copolymer, determined according to ASTM Designation D–1053–49T is as follows:

$$T_2 = -19° C.;\ T_5 = -21° C.;\ T_{10} = -26° C.$$
$$T_{100} = -30° C.$$

Example II

Employing the procedure set forth in Example I and the same emulsion polymerization system, the tube was charged with 2.5 grams of 1,1,3-trifluoro-1,3-butadiene and 2.5 grams of 1,1,2-trifluoro-1,3-butadiene monomers to make up a total monomer charge containing 50 mole percent of each monomer. The polymerization reaction was carried out under autogenous conditions of pressure at a temperature of 50° C. for a period of 24 hours. The resultant elastomeric product was worked-up in accordance with the same procedure as set forth in Example I. A tough snappy rubber was obtained and, upon analysis, was found to comprise approximately 60 mol percent of 1,1,2 - trifluoro - 1,3 - butadiene, the remaining major constituent being 1,1,3-trifluoro-1,3-butadiene. The copolymer was obtained in an amount corresponding to a 70% conversion.

Example III

Employing the procedure set forth in Example I and the same emulsion catalyst system, the tube was charged with 1.25 grams of 1,1,3-trifluoro-1,3-butadiene and 3.75 grams of 1,1,2-trifluoro-1,3-butadiene to make up a total monomer charge containing 25 mol percent of 1,1,3-trifluoro-1,3-butadiene and 75 mol percent of 1,1,2-trifluoro-1,3-butadiene. The polymerization reaction was carried out under autogenous conditions of pressure at a temperature of 50° C. for a period of 24 hours. The resultant elastomeric product was worked-up in accordance with the same procedure as set forth in Example I. A tough, snappy rubber was obtained and, upon analysis, was found to comprise approximately 80 mol percent 1,1,2-trifluoro-1,3-butadiene and the remaining major constituent being 1,1,3-trifluoro-1,3-butadiene. The copolymer was obtained in an amount corresponding to a 76% conversion.

Example IV

This example illustrates the copolymerization of 1,1,2,4-tetrafluoro-1,3-butadiene and 1,1,3-trifluoro-1,3-butadiene.

Employing the procedure set forth in Example I and the same emulsion catalyst system, the tube was charged with 1.4 grams of 1,1,2,4-tetrafluoro-1,3-butadiene and 3.6 grams of 1,1,3-trifluoro-1,3-butadiene to make up a total monomer charge comprising 25 mole percent of 1,1,2,4-tetrafluoro-1,3-butadiene and 75 mole percent of 1,1,3-trifluoro-1,3-butadiene. The polymerization reaction was carried out under autogenous conditions of pressure at a temperature of 50° C. for a period of 24 hours. The resultant elastomeric product was worked-up in accordance with the same procedure as set forth in Example I. An elastomeric rubbery product was obtained and, upon analysis, was found to comprise 56 mol percent of 1,1,2,4-tetrafluoro-1,3-butadiene, the remaining major constituent being 1,1,3 - trifluoro-1,3-butadiene. The copolymer was obtained in an amount corresponding to a 12% conversion.

Example V

This example illustrates the copolymerization of perfluoro-1,3-butadiene and 1,1,2-trifluoro-1,3-butadiene.

Employing the procedure set forth in Example I and the same emulsion catalyst system, the tube was charged with 2.5 grams of perfluorobutadiene and 2.5 grams of 1,1,2-trifluoro - 1,3-butadiene, to make up a total monomer charge comprising 40 mol percent of perfluorobutadiene and 60 mol percent of 1,1,2-trifluoro-1,3-butadiene. The polymerization reaction was carried out under autogenous conditions of pressure at a temperature of 50° C. for a period of 24 hours. The resultant elastomeric product was worked-up in accordance with the same procedure as set forth in Example I. An elastomeric product was obtained and, upon analysis, was found to comprise approximately 20 mol percent of perfluorobutadiene, the remaining major constituent being 1,1,2-trifluoro-1,3-butadiene. The copolymer was obtained in an amount corresponding to a 40% conversion. The elastomeric product, after being compression molded at 250° F. for 5 minutes, remained as a rubbery material. A volume increase of 11.8% in ASTM Type II Fuel was observed. The Gehman stiffness data was as follows:

$T_2 = -14.5°$ C.; $T_5 = -30°$ C.;
$T_{10} = -35.5°$ C.; $T_{100} = -48.5°$ C.

Example VI

This example illustrates the copolymerization of perfluorobutadiene and 1,1,2-trifluoro-1,3-butadiene to produce an elastomeric copolymer.

A heavy-walled glass polymerization tube was flushed with nitrogen and was then charged with 9 ml. of a soap solution comprising 6 grams of the ammonium salt of perfluorooctanoic acid ($C_2F_{15}COONH_4$), as an emulsifier; 0.4 gram of sodium metabisulfite; 0.5 gram borax; and 0.1 gram dodecyl mercaptan dissolved in 180 ml. of water. The tube was then immersed in a liquid nitrogen freezing bath. After the contents of the tube were frozen solid, 1 ml. of an aqueous solution containing 1.0 gram of potassium persulfate in 20 ml. of water was added. The contents of the tube were then refrozen, and the tube was connected to a gas-transfer system and evacuated at liquid nitrogen temperature. To the frozen contents of the tube were added, by distillation, 2.02 grams of perfluorobutadiene and 2.98 grams of 1,1,2 - trifluoro-1,3-butadiene, which comprises a 30/70 molar ratio. The polymerization tube was sealed and rotated end-over-end in a temperature-regulated water-bath at 50° C. for a period of 22 hours. At the end of this time, the contents of the tube were coagulated by freezing at liquid nitrogen temperatures. The coagulated product was removed from the tube, washed with hot water, and dried to constant weight in vacuo at 35° C. An extensible rubbery copolymer was obtained which was found, upon analysis, to comprise approximately 22.5 mol percent of perfluorobutadiene, the remaining major constituent being 1,1,2-trifluoro-1,3-butadiene. The copolymer was obtained in an amount corresponding to a 52% conversion.

A sample of the raw copolymer was compression molded, at 300° F. for 5 minutes. After molding, the sample remained as a firm, flexible rubber. A volume increase of 40.6 was obtained in ASTM Type II Fuel. The Gehman stiffness data was as follows:

$T_2 = +15.5°$ C.; $T_5 = +5°$ C.;
$T_{10} = -1°$ C.; $T_{100} = -25.5°$ C.

Example VII

This example illustrates the copolymerization of 1,1,2-trifluoro - 1,3 - butadiene and 1,1 - difluoro - 1,3-butadiene to produce an elastomeric copolymer.

Employing the procedure set forth in Example VI and the same emulsion catalyst system, the tube was charged with 2.73 grams of 1,1,2-trifluoro-1,3-butadiene and 2.27 grams of 1,1-difluorobutadiene to make up a total monomer charge containing 50 mole percent of each monomer. The polymerization reaction was carried out under autogenous conditions of pressure at a temperature of 50° C. for a period of 23 hours. The resultant elastomeric product was worked-up in accordance with the same procedure as set forth in Example VI. A firm, flexible, rubbery product was obtained which was found, upon analysis, to comprise approximately 71 mol percent 1,1,2-trifluoro-1,3-butadiene, the remaining major constituent being 1,1-difluorobutadiene. The copolymer was obtained in an amount corresponding to a 66% conversion.

A sample of the raw copolymer was compression molded at 350° F. for 5 minutes. After molding, the sample remained as a firm, flexible rubber. The volume increase of 8.4% in ASTM Type II fuel was obtained. The Gehman stiffness data was as follows:

$T_2 = +20°$ C.; $T_5 = 0°$ C.;
$T_{10} = -16.5°$ C.; $T_{100} = -23°$ C.

Example VIII

This example illustrates the copolymerization of 1,1,2, 4,4 - pentafluoro - 1,3 - butadiene and 1,1,3 - trifluoro-1,3-butadiene to produce an elastomeric copolymer.

Employing the procedure set forth in Example VI and the same emulsion catalyst system, the tube was charged with 2.86 grams of 1,1,2,4,4-pentafluoro-1,3-butadiene and 2.14 grams of 1,1,3-trifluoro-1,3-butadiene to make up a total monomer charge comprising 50 mol percent of 1,1,2,4,4-pentafluoro-butadiene and 50 mol percent of 1,1,3-trifluoro-1,3-butadiene. The polymerization reaction was carried out under autogenous conditions of pressure at a temperature of 50° C. and for a period of 24 hours. The resultant elastomeric product was worked-up in accordance with the same procedure as set forth in Example VI. The 1,1,2,4,4-pentafluoro-1,3-butadiene was prepared as follows: 1-chloro-1,2-dibromo-1,2,2-trifluoroethane, $CF_2BrCFClBr$, was added to vinylidene fluoride to yield $CF_2BrCFClCH_2CF_2Br$, which was then dehydrobrominated using potassium hydroxide, followed by debromochlorination using zinc to yield $$CF_2=CF-CH=CF_2$$

B.P. 15.0° C.–15.5° C.

An elastomeric copolymer was obtained and, upon analysis, was found to comprise approximately 54.5 mol percent of 1,1,2,4,4-pentafluoro-1,3-butadiene, the remaining major constituent being 1,1,3-trifluoro-1,3-butadiene. The copolymer was obtained in an amount corresponding to an 83% conversion.

Example IX

This example illustrates the copolymerization of perfluorobutadiene and 1,1,3-trifluoro-1,3-butadiene to produce an elastomeric copolymer.

Employing the procedure set forth in Example VI and the same emulsion catalyst system, the tube was charged with 3 grams of perfluorobutadiene and 2 grams of 1,1,3-trifluoro-1,3-butadiene to make up a total monomer charge and comprising 50 mole percent of each monomer. The polymerization reaction was carried out at a temperature of 50° C. under autogenous conditions of pressure for a period of 72 hours. The resultant elastomeric product was worked-up in accordance with the same procedure as set forth in Example VI. An elastomeric product was obtained and, upon analysis, was found to comprise 33.5 mol percent of perfluorobutadiene, the remaining major constituent being 1,1,3-trifluoro-1,3-butadiene. The copolymerization was obtained in an amount corresponding to a 39% conversion.

A sample of the raw copolymer was compression molded at 350° F. and for 5 minutes. After molding, the sample remained as a flexible rubber. A volume increase of 21% was obtained in ASTM Type II Fuel. The Gehman stiffness data was as follows:

$T_2=-3°$ C.; $T_5=-6°$ C.; $T_{10}=-25°$ C.; $T_{100}=-50°$ C.

Example X

This example illustrates the copolymerization of perfluorobutadiene and 1,1-difluoro-1,3-butadiene to produce an elastomeric copolymer.

A heavy-walled glass polymerization tube was flushed with nitrogen and was then charged with 6 ml. of a soap solution (pH 10.2) containing 5.0 grams of potassium stearate (KORR soap) and 0.3 gram dodecyl mercaptan dissolved in 120 ml. of water; and with 4 ml. of a catalyst solution comprising 0.3 gram of potassium persulfate dissolved in 80 ml. of water. The tube was then placed in a Dry Ice-acetone freezing bath. After the contents of the tube were frozen solid, it was connected to a gas-transfer system and evacuated at liquid nitrogen temperature. To the frozen contents of the tube were added, by distillation, 3.26 grams of perfluorobutadiene and 1.74 grams of 1,1-difluorobutadiene, to make up a total monomer charge containing 50 mole percent of each monomer. The polymerization tube was then sealed and rotated end-over-end in a temperature-regulated water-bath at 50° C. The polymerization was conducted under autogenous pressure for a period of 22 hours. The polymer latex thus obtained was coagulated by freezing at liquid nitrogen temperature. The coagulated product was collected, washed with hot water and dried to constant weight in vacuo at 35° C. An elastomeric rubbery product was obtained which was found, upon analysis, to comprise approximately 32 mol percent of perfluorobutadiene, the remaining major constituent being 1,1-difluorobutadiene. The copolymer was obtained in an amount representing a 42% conversion.

A sample of the raw polymer was compression molded at 300° F. for 5 minutes. After molding, the sample remained as an elastomeric product. A volume increase of 38% was obtained in ASTM Type II Fuel. The Gehman stiffness data was as follows:

$T_2=+10°$ C.; $T_5=-10°$ C.; $T_{10}=-17°$ C.
$T_{100}=-29°$ C.

Example XI

This example illustrates the copolymerization of perfluorobutadiene and 5,5,5-trifluoro-1,3-pentadiene to produce an elastomeric copolymer.

A heavy-walled glass polymerization tube was flushed with nitrogen and was then charged with 5 ml. of a soap solution containing 2.5 grams of the ammonium salt of perfluorooctanoic acid and 0.15 gram of dodecyl mercaptan in 180 ml. solution; and then with 4 ml. of a catalyst solution comprising 0.3 gram of potassium persulfate dissolved in 80 ml. of water. To this mixture there was then added a concentrated buffer solution of sodium dephosphate (1 ml.). The pH of the mixture was found to be 10. The tube was then placed in a liquid nitrogen freezing bath. After the contents of the tube were frozen solid, the tube was connected to a gas-transfer system and evacuated at liquid nitrogen temperatures. To the frozen contents of the tube were added, by distillation, 2.85 grams of perfluorobutadiene and 2.15 grams of 5,5,5-trifluoropentadiene-1,3 to make up a total monomer charge containing 50 mole percent of each monomer. The 5,5,5-trifluoro-1,3-pentadiene was obtained in accordance with the disclosure in the Journal of the American Chemical Society, vol. 76, p. 5147 (1954). The polymerization tube was then sealed and rotated end-over-end in a temperature-regulated water-bath at 50° C. The polymerization was conducted under autogenous pressure at 50° C. for a period of 90 hours. The polymer latex thus obtained was coagulated by freezing at liquid nitrogen temperature. The coagulated product was collected, washed with hot water, and dried to constant weight in vacuo at 35° C. A flexible rubbery product was obtained and was found, upon analysis, to comprise approximately 19 mol percent of perfluorobutadiene, the remaining major constituent being 5,5,5-trifluoro-1,3-pentadiene. The copolymer was obtained in an amount corresponding to a 40% conversion.

A sample of the raw copolymer was compression molded at 300° F. for 5 minutes. After molding, the sample remained as a flexible rubber.

Example XII

This example illustrates the copolymerization of 5,5,5-trifluoro-1,3-pentadiene and 1,1-difluoro-1,3-butadiene.

Employing the procedure as set forth in Example XI and the same emulsion catalyst system, the tube was charged with 2.87 grams of 5,5,5-trifluoro-1,3-pentadiene and 2.13 grams of 1,1-difluoro-1,3-butadiene to make up the total monomer charge containing 50 mole percent of each monomer. The polymerization reaction was carried out under autogenous conditions of pressure at a temperature of 50° C. for a period of 24 hours. The resulting elastomeric product was worked-up in accordance with the same procedure as set forth in Example XI. A soft, flexible rubber was obtained and, upon analysis, it was found to comprise approximately 90 mol percent of 5,5,5-trifluoro-1,3-pentadiene, the remaining major constituent being 1,1-difluorobutadiene. The copolymer was obtained in an amount corresponding to a 100% conversion.

A sample of the raw copolymer was compression molded at 300° F. for 5 minutes. After molding, the sample remained as a soft, flexible rubber. A volume increase of 62% was obtained in ASTM Type II Fuel. The Gehman stiffness data was as follows:

$T_2=0°$ C.; $T_5=-4°$ C.; $T_{10}=-5°$ C.; $T_{100}=-10°$ C.

Example XIII

This example illustrates the copolymerization of 1,1,3-trifluoro-1,3-butadiene and 1,1-difluoro-1,3-butadiene to produce an elastomeric copolymer.

A heavy-walled glass polymerization tube was flushed with nitrogen and then charged with 1 ml. of a solution containing 0.4 gram of sodium metabisulfite and 0.5 gram of borax in 20 ml. of water. The contents of the tube were then frozen and the tube was next charged with 5 ml. of a soap solution comprising 5 grams of potassium stearate (KORR soap) dissolved in 100 cc. of water. The pH of the soap solution was first adjusted with a 5% solution of potassium hydroxide to 10. The contents of the tube were next refrozen in Dry Ice-acetone and the tube was then charged with 4 ml. of a catalyst solution comprising 1.0 gram of potassium persulfate dissolved in 80 ml. of water. The tube was next connected to a gas-transfer system and evacuated at liquid nitrogen temperature. To the frozen contents of the tube were added, by distillation, 2.78 grams of 1,1,3-trifluoro-1,3-butadiene and 2.22 (45%) grams of 1,1-difluorobutadiene monomers, to make up a total monomer charge containing 50 mole percent of each monomer. The polymerization tube was then sealed and rotated end-over-end in a temperature-regulated water-bath at 50° C. The polymerization was conducted under autogenous conditions of pressure at 50° C. for a period of 26 hours. The polymer latex thus obtained was coagulated by freezing at liquid nitrogen temperature. The coagulated product was collected, washed with hot water and dried to constant weight in vacuo at 35° C. A rubbery product was obtained, which was found, upon analysis, to comprise approximately 54 mol percent 1,1,3-trifluoro-1,3-butadiene, the remaining major constituent being 1,1-difluoro-1,3-butadiene. The copolymer was obtained in an amount corresponding to a 36% conversion.

Example XIV

This example illustrates the copolymerization of perfluorobutadiene and 1,1,2,4-tetrafluoro-1,3-butadiene to produce an elastomeric copolymer.

Employing the procedure set forth in Example XIII and the same catalyst solution, without the presence of borax, the tube was charged with 2.80 grams of perfluorobutadiene and 2.1 grams of 1,1,2,4-tetrafluorobutadiene monomers to make up a total monomer charge containing 50 mole percent of each one. The polymerization reaction was carried out under autogenous conditions of pressure at a temperature of 50° C. for a period of 70 hours. The resultant elastomeric product was worked-up in accordance with the same procedure as set forth in Example XIII. An elastomeric copolymer was obtained and found to comprise approximately 40 mol percent of perfluorobutadiene and the remaining major constituent being 1,1,2,4-tetrafluorobutadiene. The above copolymer was obtained in an amount corresponding to a 2% conversion.

Example XV

This example illustrates the copolymerization of 1,1,2,4-tetrafluoro-1,3-butadiene and 1,1,3-trifluoro-1,3-butadiene to produce an elastomeric copolymer.

Employing the procedure set forth in Example XIII and the same emulsion catalyst system, the tube was charged with 2.7 grams of 1,1,2,4-tetrafluoro-1,3-butadiene and 2.3 grams of 1,1,3-trifluoro-1,3-butadiene monomers to make up the total monomer charge containing 50 mole percent of each monomer. The polymerization reaction was carried out under autogenous conditions of pressure, at a temperature of 50° C. and for a period of 70 hours. The resultant elastomeric product was worked-up in accordance with the same procedure as set forth in Example XIII. A soft, snappy rubber was obtained and, upon analysis, was found to comprise approximately 97.5 mol percent 1,1,2,4-tetrafluoro-1,3-butadiene, the remaining major constituent being 1,1,3-trifluoro-1,3-butadiene. The copolymer was obtained in an amount corresponding to a 44% conversion.

Example XVI

This example illustrates the copolymerization of 1,1,2,4-tetrafluoro-1,3-butadiene and 1,1,2-trifluoro-1,3-butadiene to produce an elastomeric copolymer.

Employing the procedure set forth in Example XIII and the same emulsion catalyst system, the tube was charged with 2.7 grams of 1,1,2,4-tetrafluoro-1,3-butadiene and 2.3 grams of 1,1,2-trifluoro-1,3-butadiene to make up a total monomer charge containing 50 mol percent of each one. The polymerization reaction was carried out under autogenous conditions of pressure at a temperature of 50° C. for a period of about 70 hours. The resultant elastomeric product was worked-up in accordance with the same procedure as set forth in Example XIII. An elastomeric product was obtained and, upon analysis, it was found to comprise approximately 96.5 mol percent of 1,1,2,4-tetrafluoro-1,3-butadiene, the remaining major constituent being 1,1,2-trifluoro-1,3-butadiene. The copolymer was obtained in an amount corresponding to a 63% conversion.

Example XVII

This example illustrates the copolymerization of 1,1,2,4-tetrafluoro-1,3-butadiene and 1,1-difluoro-1,3-butadiene to produce an elastomeric copolymer.

A heavy-walled glass polymerization tube was flushed with nitrogen and then charged with 1 ml. of a solution containing 0.4 gram of sodium metabisulfite dissolved in 180 ml. of water. The contents of the tube were next frozen and to the tube were added 7.5 ml. of a soap solution containing the potassium salt of perfluorooctanoic acid (0.75 gram) dissolved in 150 ml. of water. The pH of the resultant mixture was adjusted with potassium hydroxide to 10. The tube was then refrozen and to it was charged 4 ml. of a catalyst solution containing 1.0 gram of potassium persulfate dissolved in 30 ml. of water. The tube was then connected to a gas-transfer system and evacuated at liquid nitrogen temperature. To the frozen contents of the tube were added, by distillation, 2.92 grams of 1,1,2,4-tetrafluoro-1,3-butadiene and 2.08 grams of 1,1-difluoro-1,3-butadiene which comprised a 50/50 molar ratio. The polymerization tube was sealed and rotated end-over-end in a temperature-regulated water-bath at 50° C., under autogenous conditions of pressure and for a period of 65 hours. The polymer latex thus obtained was coagulated by freezing at liquid nitrogen temperature. The coagulated product was collected, washed with hot water and dried to constant weight in vacuo at 35° C. A snappy rubber was obtained which was found, upon analysis, to comprise approximately 73 mol percent of 1,1,2,4 - tetrafluoro - 1,3 - butadiene, the remaining major constituent being 1,1-difluoro-1,3-butadiene. The copolymer was obtained in an amount corresponding to a 46% conversion.

As previously indicated, the elastomeric copolymers of the present invention possess highly desirable chemical and physical properties which makes them useful for the fabrication of a wide variety of rubber-like articles or for application to various surfaces as protective coatings. In such uses, the raw elastomeric copolymer can be pressed into sheets at temperatures between about 210° F. and about 400° F., from which various articles, such as gaskets, diaphragms, etc., can be fabricated. In this respect, it should also be noted that it is preferred, in such applications, that the raw copolymer also include various vulcanizing agents and fillers.

When employed as protective coatings on any of the surfaces previously described, the raw elastomeric copolymer is dissolved in any of the aforementioned solvents, and is applied to the desired surface employing such an apparatus as a knife spreader or a doctor-blade or a reverse-roll coater. The solvent, after the elastomeric coating composition has been applied to the surface, is permitted to evaporate. This may also be accomplished in the presence of elevated temperatures. In many applications it is desirable to include in the elastomeric coating composition various vulcanizing agents, in which case supplementary heat-treatment of the coating is required, either during the solvent-removal step or subsequently. After the solvent has been completely evaporated and after the vulcanization step, if included, has been completed, the coated surface is now ready for use. In this respect, it should also be noted that the copolymeric coating composition may be applied to the surface either as a single coat, or if so desired, the protective coating may be built-up by the application of several layers, each layer being permitted to harden by solvent evaporation before the next layer is applied. Furthermore, if so desired, the protective coatings, or the elastomeric copolymer, when obtained in the form of sheets, may be suitably pigmented. Other uses for the copolymer of the present invention reside in the fabrication of pressure sensitive tape for electrical insulation purposes, or as adhesives for fastening a rubber surface to a metal or another rubber surface.

Since certain changes may be made in carrying out the process of the present invention in producing the desired elastomeric copolymers without departing from the scope of the invention, it is intended that all matter contained in the above description is to be interpreted as illustrative and not in a limiting sense.

We claim:

1. A process which comprises copolymerizing a polymerizable straight-chain 1,3-diene having from 4 to 5 carbon atoms per molecule and containing at least one hydrogen atom and at least one terminal carbon atom having at least two fluorine substituents and 1,1,2-trifluorobutadiene-1,3 in the presence of a peroxy compound as a promoter at a temperature between about 25° C. and about 50° C.

2. The process of claim 1 in which the respective dienes are 1,1,2-trifluorobutadiene-1,3 and 1,1,3-trifluorobutadiene-1,3.

3. The process of claim 1 in which the respective dienes are 1,1,2-trifluorobutadiene-1,3 and 1,1-difluorobutadiene-1,3.

4. A copolymerization product of a polymerizable straight-chain 1,3-diene having from 4 to 5 carbon atoms per molecule and containing at least one hydrogen atom and at least one terminal carbon atom having at least two fluorine substituents and 1,1,2-trifluorobutadiene-1,3.

5. A copolymer of 1,1,2-trifluorobutadiene-1,3 and 1,1,3-trifluorobutadiene-1,3.

6. A copolymerization product of 1,1,2-trifluorobutadiene-1,3 and 1,1-difluorobutadiene-1,3.

References Cited

UNITED STATES PATENTS

| 2,686,207 | 8/1954 | Crane et al. | |
| 2,700,661 | 1/1955 | Miller | 260—87.5 |
| 2,750,431 | 6/1956 | Tarrent et al. | 260—87.7 |

JAMES A. SEIDLECK, *Primary Examiner.*